US011750696B2

(12) United States Patent
Nguyen et al.

(10) Patent No.: US 11,750,696 B2
(45) Date of Patent: Sep. 5, 2023

(54) COMMISSIONING DISTRIBUTED CONTROL NODES

(71) Applicant: Yokogawa Electric Corporation, Tokyo (JP)

(72) Inventors: Vien Nguyen, Frisco, TX (US); Patrick Clay, Frisco, TX (US); David Emerson, Coppell, TX (US); Hidenori Sawahara, Spring, TX (US); Andrew Keller, Lewisville, TX (US); Joseph Malm, Plano, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/207,905

(22) Filed: Mar. 22, 2021

(65) Prior Publication Data

US 2022/0303338 A1 Sep. 22, 2022

(51) Int. Cl.
*H04L 67/1036* (2022.01)
*H04L 67/101* (2022.01)
*H04L 67/00* (2022.01)
*H04L 9/40* (2022.01)
*H04L 67/12* (2022.01)

(52) U.S. Cl.
CPC ...... *H04L 67/1036* (2013.01); *H04L 63/0823* (2013.01); *H04L 67/101* (2013.01); *H04L 67/12* (2013.01); *H04L 67/34* (2013.01)

(58) Field of Classification Search
CPC ............. H04L 67/1036; H04L 63/0823; H04L 67/101; H04L 67/12; H04L 67/34
See application file for complete search history.

(56) References Cited

U.S. PATENT DOCUMENTS

| 2007/0150565 A1* | 6/2007 | Ayyagari | H04W 40/30 709/223 |
| 2018/0150061 A1 | 5/2018 | Yang et al. | |
| 2018/0239651 A1* | 8/2018 | Gong | G06F 12/0813 |
| 2018/0255091 A1 | 9/2018 | Mestha et al. | |
| 2019/0041830 A1 | 2/2019 | Yarvis et al. | |
| 2019/0098072 A1* | 3/2019 | Sato | G06F 11/1637 |
| 2019/0163548 A1* | 5/2019 | Wetterwald | G06F 9/4862 |
| 2020/0310394 A1* | 10/2020 | Wouhaybi | H04L 67/125 |

OTHER PUBLICATIONS

Japan Patent Office; Written Opinion of the International Searching Authority issued for Application No. PCT/B2022/052619, 6 pages, dated Jun. 7, 2022.

* cited by examiner

*Primary Examiner* — Suraj M Joshi
*Assistant Examiner* — Jaren Means
(74) *Attorney, Agent, or Firm* — Gray Ice Higdon

(57) ABSTRACT

Implementations are described herein for commissioning a distributed control node (DCN) to a process automation network. In various implementations, one or more messages transmitted on the process automation network by the DCN announcing that the DCN has joined the process automation network may be detected. Based on the one or more messages, one or more operational technology (OT) capabilities of the DCN may be determined. Based on the one or more OT capabilities, the DCN may be commissioned to the process automation network, e.g., by configuring the DCN to cooperate with one or more other process automation nodes on the process automation network to implement an at least partially automated process.

18 Claims, 5 Drawing Sheets

COMMISSIONING DISTRIBUTED CONTROL NODES

BACKGROUND

In certain process automation systems, it is common for heterogeneous hardware and software to be supplied by various vendors. Consequently, the work to commission and onboard devices from different vendors may require significant efforts and knowledge or familiarity with each type of device. Each device may have different hardware and software specifications, as well as different operational technology (OT) capabilities such as sensing, controlling, actuating, computing, etc.

SUMMARY

Implementations are described herein for commissioning devices, such as compute and/or input/output (I/O) gates that are referred to in some contexts as distributed control nodes (DCNs), to process automation networks. More particularly, but not exclusively, implementations are described herein for automatically discovering types and/or operational technology (OT) capabilities of DCNs that are added to process automation networks, such as process automation networks that comply with open standards that allow for the integration of heterogeneous components from various vendors. These types and/or OT capabilities may include, for instance, software and hardware specifications, supported OT capabilities (e.g., protocol, signal types, control runtime engine, etc.), open standard conformance profiles, and so forth. In addition, techniques are proposed for automatically configuring newly added devices based on the information collected during the discovery process. Techniques described herein may save time, effort, reduce human mistakes, and/or mitigate occurrences of system downtime or other system interruptions. For example, a failed DCN may be replaced or upgraded more quickly, while providing improved and/or uninterrupted system availability.

In some implementations, a method for commissioning a DCN to a process automation network may be implemented using one or more processors and may include: detecting one or more messages transmitted on the process automation network by the DCN, wherein the one or more messages announces that the DCN has joined the process automation network; based on the one or more messages, determining one or more operational technology (OT) capabilities of the DCN; and based on the one or more OT capabilities, commissioning the DCN to the process automation network, wherein the commissioning includes configuring the DCN to cooperate with one or more other process automation nodes on the process automation network to implement an at least partially automated process.

In various implementations, the method may include identifying, based on the one or more OT capabilities, the one or more other process automation nodes on the process automation network that are compatible with the DCN. In various implementations, the identifying may include matching at least one actuator of the process automation network with the DCN based on a profile of the at least one actuator. In various implementations, the identifying may include matching at least one sensor of the process automation network with the DCN based on a profile of the at least one sensor.

In various implementations, the detecting may include receiving the message as a multicast message. In various implementations, the configuring may include causing configuration data to be installed on the DCN, wherein the configuration data facilitates cooperation between the DCN and the one or more other nodes on the process automation network to implement the at least partially automated process. In various implementations, the causing may include pushing the configuration data to the DCN over the process automation network.

In various implementations, the one or more OT capabilities of the added DCN may include one or more of: a count of input/output (I/O) channels of the DCN; a type of I/O channel of the DCN; a range limit associated with the DCN; a preferred unit of measurement of the DCN; an update frequency of the DCN; one or more analog-to-digital conversion parameters of the DCN; one or more signal conditioning parameters of the DCN; or any combination thereof.

In various implementations, the method may further include verifying or authenticating the DCN based on data received over one or more computer networks from a vendor system associated with the DCN. In some such implementations, the verifying may include cross-referencing identification information associated with the DCN with the data received from the vendor system.

In another aspect, a DCN may include logic/circuitry to: transmit one or more messages on a process automation network, wherein the one or more messages announce that the DCN has joined the process automation network and convey one or more OT capabilities of the DCN; receive configuration data from a configuration node over the process automation network, wherein the configuration data includes: IT configuration data that enables the DCN to engage in network communication with other nodes on the process automation network, and OT configuration data that enables the DCN to cooperate with one or more compatible actuators or sensors on the process automation network to implement an at least partially automated process; and in accordance with the configuration data, exchange data with one or more of compatible actuators or sensors to implement the at least partially automated process.

In various implementations, the circuitry may be configured to receive a software or firmware update from, or at the direction of, the configuration node. In various implementations, the IT configuration data may include a security certificate to facilitate encrypted communication. In various implementations, the IT configuration data may include time sensitive networking settings.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
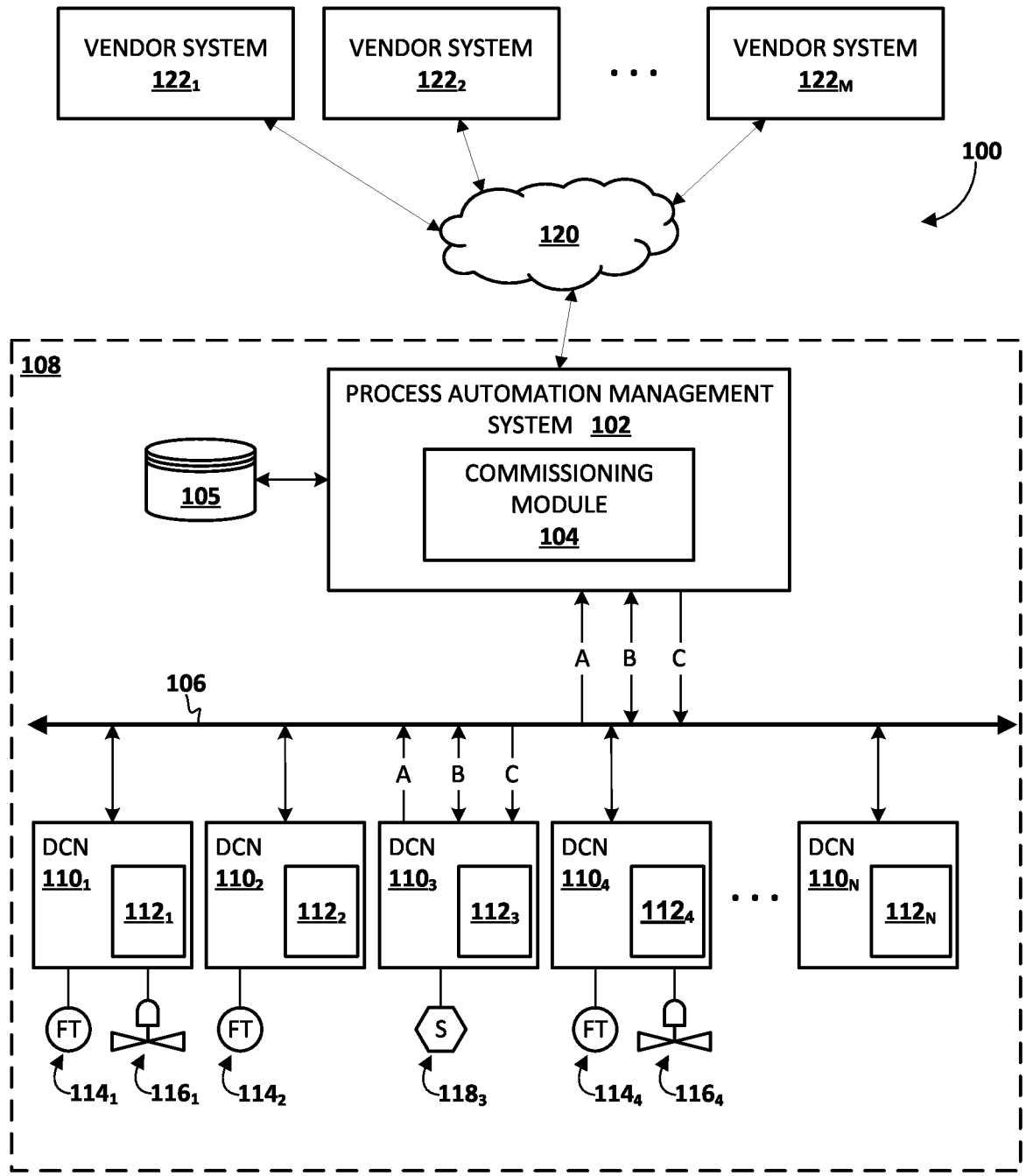
FIG. 1 schematically depicts an environment in which selected aspects of the present disclosure may be implemented, in accordance with various embodiments.

Implementations are described herein for commissioning devices to process automation applications and/or systems. More particularly, but not exclusively, implementations are described herein for automatically discovering types and/or operational technology (OT) capabilities of devices such as distributed control nodes (DCNs) that are added to process automation networks, such as process automation networks that comply with open standards that allow for the integration of heterogeneous components from various vendors. These types and/or OT capabilities may include, for instance, software and hardware specifications, supported OT capabilities (e.g., protocol, signal types, control runtime engine, etc.), open standard conformance profiles, and so forth. In addition, techniques are proposed for automatically configuring devices based on the information collected during the discovery process. Techniques described herein may save time, effort, reduce human mistakes, and/or mitigate against occurrences of system downtime and/or failure. For example, a failed DCN may be replaced or upgraded faster while providing improved and/or uninterrupted system availability.

In various implementations, when a DCN or other similar device is connected to a process automation network, the DCN may announce itself, e.g., by broadcasting or multicasting one or more messages on the process automation network. A configuration node on the process automation network (e.g., a central server) may detect these message(s) and determine OT capabilities of the added DCN. Based on these OT capabilities, the configuration node may commission the added DCN to the process automation network. In some implementations, this commissioning may include applying security policies and/or updates, and configuring the added DCN to cooperate with one or more other nodes on the process automation network to implement an at least partially automated process.

As used herein, an "at least partially automated process" includes any process cooperatively implemented within a process automation system by multiple devices with little or no human intervention. One common example of an at least partially automated process is a process loop of a process automation network in which one or more actuators are operated automatically (without human intervention) based on output of one or more sensors. Some at least partially automated processes may be sub-processes of an overall process automation system, such as a single process loop mentioned previously. Other at least partially automated processes may comprise all or a significant portion of an entire process automation system. In some cases, the degree to which a process is automated may exist along a gradient, range or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, etc.

In various implementations, a newly-added DCN may be configured with (e.g., pushed) one or both of information technology (IT) configuration data (operating system, device drivers, security and network policy, etc.) and OT configuration data. IT configuration data may enable the DCN to securely engage in network communication with other nodes on the process automation network, and may include, for instance, networking parameters, hardware parameters, etc. In some cases, IT configuration data may be determined based at least in part on IT capabilities of the added DCN, such as redundancy capabilities; interfaces (serial, USB, Ethernet, wireless, . . . ); storage type (e.g., hard disk drive, solid state drive, memory card, etc.); time-sensitive networking; global positioning system (GPS) capabilities; or any combination thereof.

OT configuration data may be generated at least in part on OT capabilities of the added DCN and/or the compatibility of those OT capabilities with OT capabilities of other devices in a process automation system. In many cases, OT capabilities may be included in a "profile" associated with the added DCN. OT capabilities may vary widely among industries. In some cases, OT capabilities may include, but are not limited to, a count of input/output (I/O) channels of the added DCN; one or more types of one or more I/O channels of the added DCN; a range limit associated with the added DCN; a preferred unit of measurement of the added DCN; an update frequency of the added DCN; one or more analog-to-digital conversion parameters of the added DCN; one or more signal conditioning parameters of the added DCN; supported open standard protocols such as the Open Platform Communications (OPC) Unified Architecture (OPC UA) and/or Modbus; or any combination thereof. OT configuration data may include, for instance, identifiers (e.g., IP addresses) of compatible process automation nodes on the process automation system, OT parameters (e.g., units of measure, range adjustments, open communication protocols, etc.) to be used during operation, and so forth.

In some implementations, IT and OT capabilities and/or configuration data may overlap and/or be combined. In other implementations, they may be disjointed.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 may take numerous forms and may be designed to implement any number of at least partially automated processes. For example, process automation facility 108 may take the form of a chemical processing plant, an oil or natural gas refinery, a catalyst factory, a manufacturing facility, etc.

Process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QoS).

Process automation management system 102 may include a commissioning module 104 and a database 105 that stores information used by commissioning module 104 to practice selected aspects of the present disclosure. Various aspects of process automation management system 102, such as commissioning module 104, may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes are operably coupled with process automation network 106. In FIG. 1, for instance, N (positive integer) DCNs $110_{1-N}$ are operably coupled with process automation network 106. Each DCN may include circuitry or logic 112 that may take various forms, such as processor(s) that execute instructions in memory, a field-programmable gate array (FPGA), an application-specific integrated circuit (ASIC), and so forth. Each DCN 110 may have a particular role to play in process automation network 106. "Compute" DCNs may, for instance, control a process loop (e.g., a chemical process loop) in which various "field" devices (e.g., devices having sensors and/or actuators) interface with each other to perform some number of function control blocks (FBs).

Each DCN 110 may have various input/output (I/O) components that dictate at least some of its OT capabilities and, more generally, its role at process automation facility 108. For example, first DCN $110_1$ includes a flow transmitter (FT) component $114_1$ and an actuator (e.g., a valve) $116_1$. In some implementations, a software component implemented on DCN $110_1$ (or any other DCN mentioned herein) may transform an analog signal to digital; and/or convert the signal between different units of measurement, for instance. In addition, in some implementations, a software component implemented on DCN $110_1$ may be configured to translate data between various protocols. For example, a particular vendor's DCN (or other legacy device) may not be configured natively to communicate data using the OPC Unified Architecture (OPC UA). In some such implementations, another DCN 110 may be deployed to translate this data from the vendor's proprietary format to OPC UA. Some such DCNs 110 may be referred to as "gateways" or "bridges" because they form a link between legacy technology and standards such as OPC UA.

Actuator $116_1$ (and other actuators described herein) may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc.

Each DCN 110 may have different OT capabilities with respect to one or more (e.g., all) other DCNs 110. In FIG. 1, for instance, second DCN $110_2$ includes a FT component $114_2$ but no actuator. Third DCN $110_3$ includes a sensor $118_3$ but no actuator. Sensor $118_3$ (and elsewhere herein) may take various forms, including but not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth. Like first DCN $110_1$, fourth DCN $110_4$ also includes both a FT component $114_4$ and an actuator $116_4$.

Unlike DCNs $110_{1-4}$, $DCN_N$ does not include any input/output (actuators or sensors). Instead, $DCN_N$ may be a "compute only" DCN whose role is to facilitate cooperation between itself and one or more other DCNs 110 on process automation network 106 to implement an at least partially automated process. For example, $DCN_N$ may control a single process loop (e.g., a chemical process control loop) that involves one or more other DCNs 110. In some cases, a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 to ascertain data about chemical levels, flow rates (e.g., across valves), tank temperatures, control rates, etc., and may control one or more actuators 116 based on these data and/or comparisons of these data to various criteria and/or thresholds. For instance, compute DCN $110_N$ can control actuator $116_4$ by transmitting, to DCN $116_4$, corresponding command(s) that can optionally conform to a protocol that is specific to DCN $116_4$.

As noted previously, adding DCNs to process automation network 106, whether as new additions, replacements, or upgrades, can be complicated and cumbersome due to the heterogeneity amongst different DCNs; this is true even with the increased implementation of open standards for process automation. Accordingly, improved techniques are described herein for commissioning or "onboarding" DCNs to process automation network 106. In some implementations, these improved techniques are implemented at least in part by commissioning module 104. However, this is not meant to be limiting, and in other implementations, techniques described herein may be implemented elsewhere, such as distributed across logics $112_{1-N}$ of DCNs $110_{1-N}$.

In various implementations, when a DCN such as third DCN $110_3$ is connected to process automation network 106, as shown at arrow A, third DCN $110_3$ may "announce" itself to other nodes on process automation network 106. For example, third DCN $110_3$ may transmit one or more messages on process automation network 106 using techniques such as broadcast and/or multicast, e.g., the multicast domain name service (multi-cast DNS). These messages may announce that third DCN $110_3$ has joined process automation network 106, and may convey one or more OT capabilities of third DCN $110_3$.

In some implementations, each DCN may have its own custom profile(s) (e.g., open standard conformance profiles) that convey information about its model, serial number, security level, number and nature of I/O channels such as FT components 114, actuators 116, and/or sensors 118, data formats for each I/O channel, etc. These profiles, which may describe baseline functionality of a DCN, may take various forms, such as representational state transfer (REST)-compliant forms like JavaScript Object Notation (JSON) and extensible markup language (XML). These profiles may be used, e.g., by commissioning module 104 and/or other nodes of process automation network 106, to determine which DCNs 110 are compatible with each other. For example, commissioning module 104 may maintain list(s) of active DCN profiles in database 105, which enables commissioning module 104 to match newly-added DCNs 110 to other DCNs 110 already connected to process automation network 106. Various types of profiles may be supported, such as I/O profiles (e.g., amps versus volts, analog versus digital), alarms processing profiles, actuator profiles, sensor profiles, etc. In some implementations, commissioning module 104 may use a lookup table or other similar mechanism (e.g., a dynamic database) to match (soft matching or exact matching) profile(s) of one DCN 110 to profile(s) of another, thereby identifying compatible DCNs.

In various implementations, commissioning module 104 may be configured to detect one or more messages transmitted on process automation network 106 by third DCN $110_3$ as shown by the arrows labeled "A." Based on the one or more messages transmitted by third DCN $110_3$, e.g., as part of a discovery handshake represented in FIG. 1 by the arrows labeled "B," commissioning module 104 may determine the IT and/or OT capability(ies) of third DCN $110_3$. In the example of FIG. 1, third DCN $110_3$ includes sensor $118_3$. As mentioned elsewhere herein, these IT and/or OT capabilities may include, for instance: software specifications; operating system (OS) specifications; hardware specifications; data formatting and/or communication protocols such as supported open standard protocols such as OPC UA and/or Modbus; signal types; control runtime engines; a count of I/O channels; types of I/O channels; range limit(s); preferred units of measurement; update frequency(ies); one or more analog-to-digital conversion parameters; one or more signal conditioning parameters; etc.

Based on the detected OT capabilit(ies), commissioning module 104 may commission third DCN $110_3$ to process automation network 106. For example, as shown by the arrows labeled "C", commissioning module 104 may configure third DCN $110_3$ to cooperate with one or more other process automation nodes on the process automation network to implement an at least partially automated process. In some implementations, commissioning module 104 may push various IT and/or OT configuration information to third DCN $110_3$ that third logic $112_3$ uses to cooperate with other DCNs to implement an at least partially automated process. In some of those implementations, commissioning module 104 can select or generate at least some of the IT and/or OT configuration information in dependence on the determined IT and/or OT capability(ies) of third DCN $110_3$.

IT configuration information may include, but is not limited to, OS or other software updates, firmware updates, software applications and/or libraries designed and/or compiled for the DCN's specific OS and/or central processing unit (CPU) architecture, etc. In some implementations, this configuration information may include a security certificate (e.g., a public key) that the DCN can use to implement encrypted communication on process automation network 106. In some implementations, this configuration information may additionally or alternatively include time sensitive network (TSN) settings.

In some implementations, e.g., as part of the discovery handshake represented by the arrows labeled "C," commissioning module 104 may authenticate a to-be-added DCN, such as third DCN $110_3$ in this example, to ensure the to-be-added DCN is legitimate and does not pose a security risk to process automation network 106. In FIG. 1, for instance, process automation management system 102 is operably coupled via one or more networks 120 (e.g., the Internet) with some number M (positive integer) of vendor systems $112_{1-M}$. Each vendor system 122 may be associated with a vendor (not depicted) of one or more components (e.g., DCNs $110_{1-N}$) used in process automation facility 108.

In some cases, a vendor system 122 may be configured to authenticate various types of credentials forwarded to it by process automation management system 102 using a variety of different authentication techniques. As one non-limiting example, each DCN 110 may be provided with a public encryption key from its respective vendor. The DCN 110 and/or process automation management system 102 may use this public key to encrypt some piece of handshake data that is then sent to the respective vendor system 122. The vendor system 122 may use its own private key to decrypt the handshake data; if the decryption is successful, the DCN 110 may be authenticated. Other variations of public key encryption are contemplated. In other implementations, as part of the discovery handshake represented by the arrows labeled "C," the DCN 110 may provide other credentials, such as a digital certificate, that a respective vendor system 122 may validate before the DCN 110 is permitted to function fully on process automation network 106.

In some implementations, a vender system 122 may verify not only the legitimacy of a DCN 110, but also whether the DCN 110 conforms to desired/requested criteria associated process automation facility 108. For example, various identification information associated with the added DCN 110, such as a serial number, model number, lot number, etc., may be cross-referenced with a purchase and/or work order created for process automation facility 108. Additionally or alternatively, IT and/or OT capabilities of the added DCN 110 may be compared with known parameters of process automation facility 108 and/or process automation network 106 to ensure compatibility. In some implementations, a vendor system 122 may push digital keys/certificates and/or other data that includes these data to process automation management system 102 so that commissioning module 104 can perform these checks locally. As an example, for a large purchase order of DCNs, the vendor system 122 may provide a file or list of relevant information about the new DCNs (e.g., serial/model numbers, capabilities, etc.) that can be used locally by commissioning module 104 to perform these checks.

Figure 2:
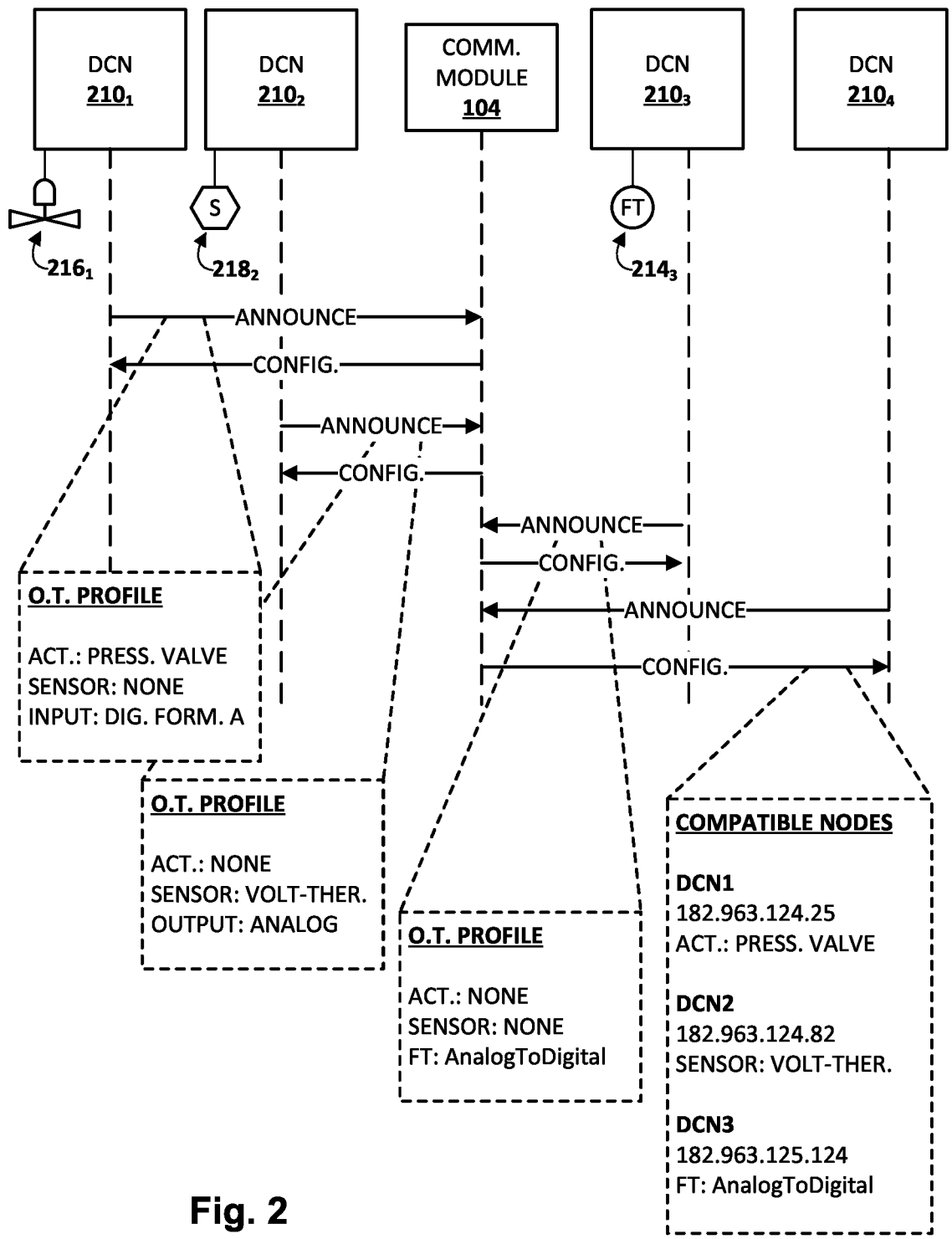
FIG. 2 schematically depicts on example of how techniques described herein may be implemented, in accordance with various embodiments.

Referring now to FIG. 2, an example commissioning process flow is depicted schematically between commissioning module 104 and four DCNs $210_{1-4}$. In FIG. 2, time advances downward on the page. A first DCN $210_1$ with an actuator $216_1$ announces itself to commissioning module 104 at top left. As mentioned previously, this announcement message may be broadcast or multicast on process automation network 106 by first DCN $210_1$. In the latter case, commissioning module 104 may have a network identifier such as an IP address that is included on a multicast address list. As shown by the dashed call-out at left, this announcement may include an operational technology ("O.T." in FIG. 2) profile (e.g., an open standard conformance profile) that designates first DCN $210_1$ has having an actuator $216_1$ that takes the form of a pressure valve, as having no sensors, and as being capable of receiving digital input in a (hypothetical) "A" format. Profiles need not necessarily be conveyed in this manner, and the profiles depicted in FIG. 2 are for illustrative purposes only. Based on the OT profile and/or other data (e.g., security data) provided by first DCN $210_1$, commissioning module 104 may generate and/or retrieve configuration data and provide it back to first DCN $210_1$, which may then implement it locally.

Next, a second DCN $210_2$ is connected to the network (106 in FIG. 1) and a similar exchange with commissioning module 104 occurs. Second DCN $210_2$ has a different OT profile that designates it as having no actuators, a voltage thermometer (sensor $218_2$), and indicates that it outputs an analog signal indicative of temperature. Then, a third DCN $210_3$ is connected to the network (106 in FIG. 1) and a similar exchange with commissioning module 104 occurs. Third DCN $210_3$ has a different OT profile that designates it as having no actuators, no sensors, and an FT component $214_3$ that converts analog data to digital data.

Lastly, a fourth DCN $210_4$ is connected to the network. Fourth DCN $210_4$ does not include any sensors, actuators, or FT components, which may be conveyed in its own announcement (for which no call-out box is shown in FIG. 2). Instead, during the configuration process, commissioning module 104 may convey to fourth DCN $210_4$ which other process automation nodes are compatible. As shown in the dashed call-out box at bottom right, the compatible nodes include first DCN $210_1$ (DCN1), second DCN $210_2$ (DCN2), and third DCN $210_3$ (DCN3). For each compatible DCN, a network identifier such as an IP address is provided, along with a relevant data about what role each compatible DCN serves. Based on these IP addresses, fourth DCN $210_4$ may thereafter cooperate with other DCNs $210_{1-3}$ to implement all or part of an at least partially automated process.

Figure 3:
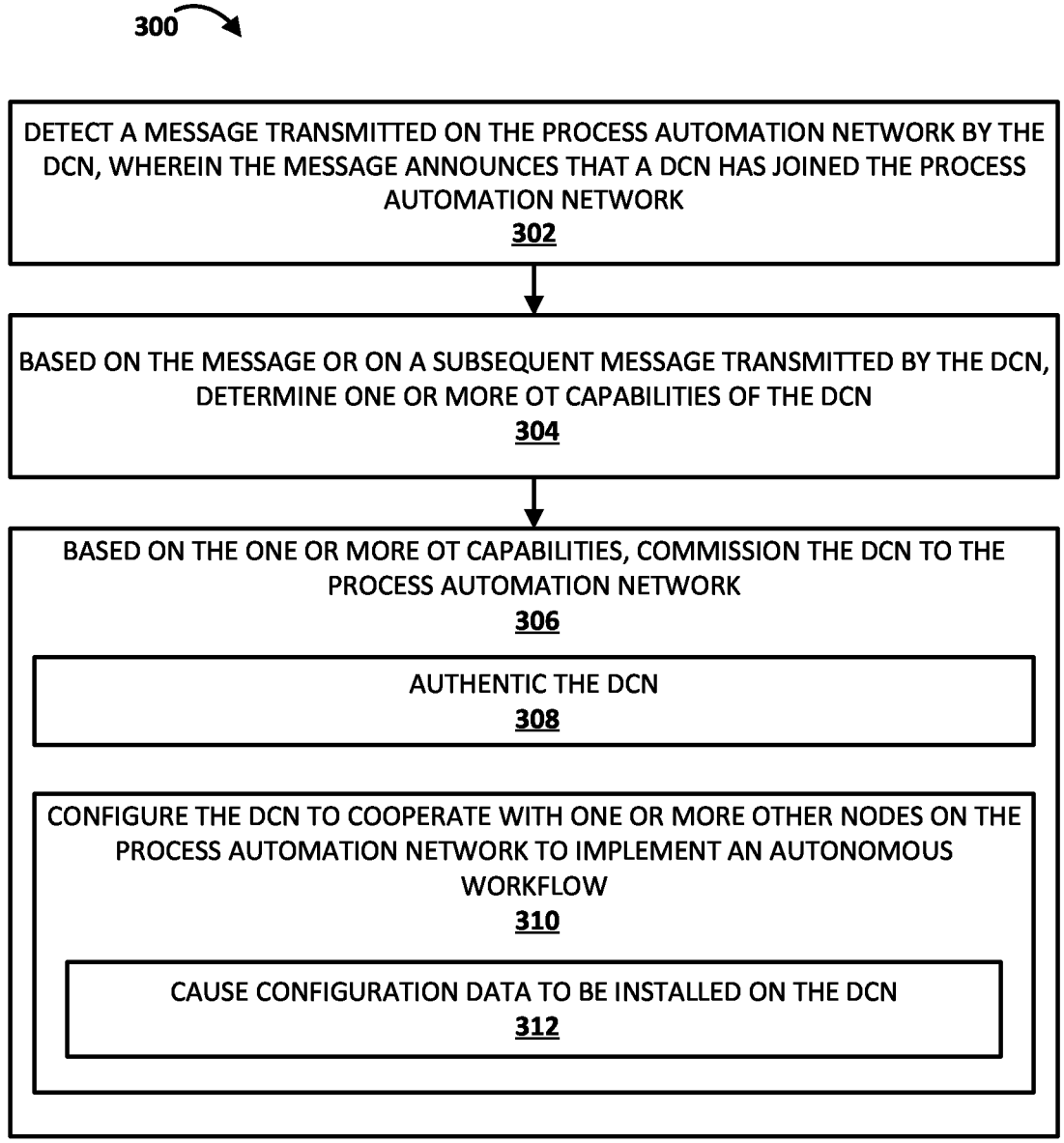
FIG. 3 illustrates an example method for performing selected aspects of the present disclosure.

FIG. 3 is a flowchart illustrating an example method 300 of practicing selected aspects of the present disclosure, in accordance with implementations disclosed herein. For convenience, the operations of the flow chart are described with reference to a system that performs the operations. This system may include various components of various computer systems, such as one or more components of process automation management system 102, including commissioning module 104. Moreover, while operations of method 300 are shown in a particular order, this is not meant to be limiting. One or more operations may be reordered, omitted or added.

At block 302, the system, e.g., by way of commissioning module 104, may detect a message transmitted on process automation network 106 by a DCN (e.g., $110_3$ in FIG. 1). In various implementations, the message may announce that the added DCN has joined process automation network 106. In some implementations, the announcement message may be broadcast by the added DCN to all nodes on process automation network 106. In other implementations, the message may be multicast by the added DCN to one or more targeted nodes (e.g., members of a multicast list), such as process automation management system 102.

Based on the message or on a subsequent message transmitted by the added DCN, at block 304, the system may determine one or more OT capabilities of the added DCN. For example, the message or subsequent message(s) may include one or more profiles (e.g., open standard conformance profiles) of the added DCN. Commissioning module 104 may match these one or more profiles of the added DCN to one or more profiles of other DCNs on process automation network 106 that are stored in database 105. For example, in some implementations, based on the one or more OT capabilities of the added DCN, the system, e.g., by way of commissioning module 104, may identify the one or more other process automation nodes on the process automation network that are compatible with the added DCN based on their respective profiles.

More particularly, in some implementations, the system may match at least one actuator 116/216 of process automation network 106 with the added DCN based on a profile of the at least one actuator. Additionally or alternatively, in some implementations, the system may match at least one sensor 118/218 of process automation network 106 with the added DCN based on a profile of the at least one sensor. Additionally or alternatively, in some implementations, the system may match at least one FT component 114/214 of process automation network 106 with the added DCN based on a profile of the at least one FT component.

Based on the one or more OT capabilities, at block 306, the system, e.g., by way of commissioning module 104, may commission the added DCN to process automation network 106. The operations associated with the commissioning of block 306 may take various forms in various implementations. In many implementations, the commissioning of block 306 may include, at block 308, authenticating the added DCN with various authorities, such as the applicable vendor system 122 of FIG. 1. The authentication of block 308 may be performed in various ways, such as using public-key cryptography, security certificates, two-factor authentication, and so forth.

At block 310, the system, e.g., by way of commissioning module 104, may configure the added DCN to cooperate with one or more other process automation nodes (e.g., other DCNs) on the process automation network to implement an at least partially automated process. In some implementations, as part of the configuring of block 310, the system may, at block 312, cause configuration data to be installed on the added DCN. The configuration data may facilitate the cooperation between the added DCN and the one or more other nodes on the process automation network to implement the at least partially automated process. In various implementations, the configuration data may include IT configuration data that enables the added DCN to engage in network communication with other nodes on process automation network 106, and/or OT configuration data that enables the added DCN to cooperate with one or more compatible FT components 114, actuators 116, and/or sensors 118 on process automation network 106 to implement the at least partially automated process.

Figure 4:
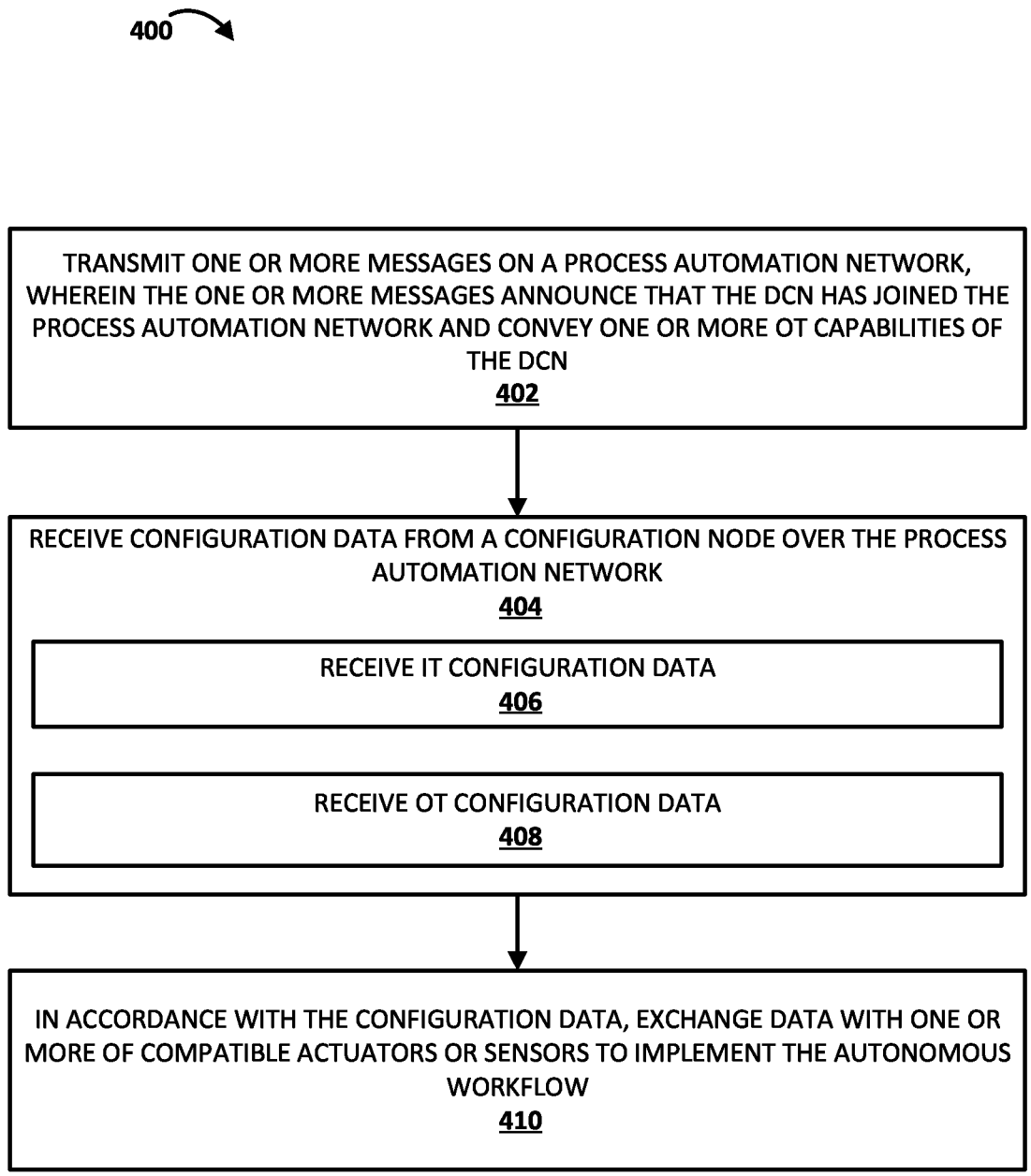
FIG. 4 illustrates another example method for performing selected aspects of the present disclosure.

FIG. 4 is a flowchart illustrating an example method 400 for a DCN 110/210 to practice selected aspects of the present disclosure, in accordance with implementations disclosed herein. While operations of method 400 are shown in a particular order, this is not meant to be limiting. One or more operations may be reordered, omitted or added.

At block 402, the DCN 110/210 may transmit one or more messages on process automation network 106. Similar to previous examples, the one or more messages may announce that the DCN has joined process automation network 106 and convey one or more OT capabilities of the DCN.

At block 404, the DCN 110/210 may receive configuration data from a configuration node such as commissioning module 104 over process automation network 106. This configuration data may vary between implementations. In some implementations, the configuration data may include IT configuration data received at block 406. IT configuration data may include, for instance, an IP address, a subnet mast, network credentials, DNS (including multicast DNS) data, and any other parameters that enable the DCN to engage in network communication with other nodes on process automation network 106. IT configuration may also include other IT parameters such as redundancy capabilities, interfaces, storage type, TSN, GPS capabilities, etc.

Additionally or alternatively, in some implementations, the configuration data may include OT configuration data received at block 408. OT configuration data may enable the DCN to cooperate with one or more compatible actuators or sensors on the process automation network to implement an at least partially automated process. A non-limiting example of OT configuration data was depicted in the dashed call-out box ("Compatible Nodes") at bottom right in FIG. 2. In accordance with the configuration data, which the DCN may install in its own memory, at block 410, the DCN may thereafter exchange data with one or more of compatible actuators or sensors, e.g., associated with/hosted by corresponding DCNs, to implement the at least partially automated process.

Figure 5:
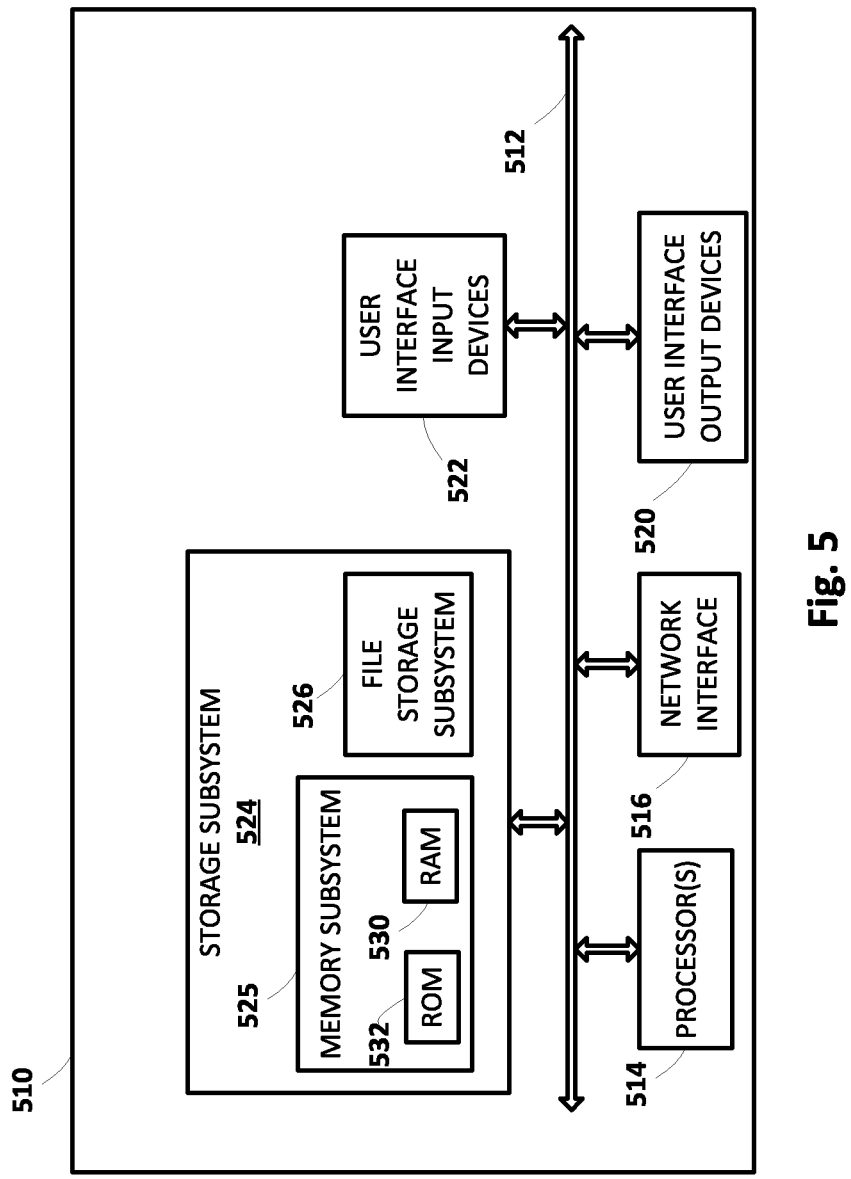
FIG. 5 schematically illustrates an example computer architecture on which selected aspects of the present disclosure may be implemented.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 3-4, as well as to implement various components depicted in FIGS. 1-2.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for commissioning a distributed control node (DCN) having multiple input/output (I/O) channels to a process automation network, the method implemented using one or more processors and comprising:

detecting one or more messages transmitted by the DCN on the process automation network, wherein the one or more messages transmitted by the DCN on the process automation network announce that the DCN has joined the process automation network and convey operational technology (OT) capabilities of the DCN, including a count of the multiple I/O channels of the DCN and types of the multiple I/O channels;

determining, from content of the one or more messages transmitted by the DCN on the process automation network, the OT capabilities of the DCN; and based on one or more of the OT capabilities, commissioning the DCN to the process automation network, wherein the commissioning includes:

matching one or more other process automation nodes on the process automation network to the DCN; and configuring the DCN to cooperate with one or more of the matched other process automation nodes on the process automation network to implement a process control loop that includes operating at least one actuator of one or more of the matched other process automation nodes based on one or more sensor signals generated by one or more of the matched other process automation nodes.

2. The method of claim 1, wherein the matching includes matching at least one actuator of the process automation network with the DCN based on a profile of the at least one actuator.

3. The method of claim 1, wherein the matching includes matching at least one sensor of the process automation network with the DCN based on a profile of the at least one sensor.

4. The method of claim 1, wherein the detecting includes receiving one or more of the messages as a multicast message.

5. The method of claim 1, wherein the configuring includes causing configuration data to be installed on the DCN, wherein the configuration data facilitates cooperation between the DCN and the one or more other nodes on the process automation network to implement the process control loop.

6. The method of claim 5, wherein the causing includes pushing the configuration data to the DCN over the process automation network.

7. The method of claim 1, wherein the one or more OT capabilities of the added DCN further include one or more of:
a range limit associated with the DCN;
a preferred unit of measurement of the DCN;
an update frequency of the DCN;
one or more analog-to-digital conversion parameters of the DCN;
one or more signal conditioning parameters of the DCN; or
any combination thereof.

8. The method of claim 1, further comprising verifying or authenticating the DCN based on data received over one or more computer networks from a vendor system associated with the DCN.

9. The method of claim 8, wherein the verifying comprises cross- referencing identification information associated with the DCN with the data received from the vendor system.

10. A distributed control node (DCN) having multiple input/output (I/O) channels and comprising circuitry to:
transmit one or more messages on a process automation network, wherein the one or more messages transmitted by the DCN on the process automation network announce that the DCN has joined the process automation network and convey one or more operational technology (OT) capabilities of the DCN, wherein the OT capabilities include a count of the multiple I/O channels of the DCN and types of the multiple I/O channels;
receive configuration data from a configuration node over the process automation network, wherein the configuration data includes:
information technology (IT) configuration data that enables the DCN to engage in network communication with other nodes on the process automation network, and
OT configuration data that enables the DCN to operate one or more compatible actuators based on one or more sensor signals generated by one or more sensors on the process automation network to implement a process control loop, wherein the one or more compatible actuators are matched with the DCN based on one or more of the OT capabilities; and
in accordance with the configuration data, exchange data with one or more of compatible actuators or sensors to implement the process control loop.

11. The DCN of claim 10, wherein the circuitry is to receive a software or firmware update from, or at the direction of, the configuration node.

12. The DCN of claim 10, wherein the IT configuration data includes a security certificate to facilitate encrypted communication.

13. The DCN of claim 10, wherein the IT configuration data includes time sensitive networking settings.

14. A system for commissioning a distributed control node (DCN) having multiple input/output (I/O) channels to a process automation network, the system comprising one or more processors that execute instructions stored in memory to:
detect one or more messages transmitted by the DCN on the process automation network, wherein the one or more messages transmitted by the DCN on the process automation network announce that the DCN has joined the process automation network and include;
operational technology (OT) capabilities of the DCN, including a count of the multiple I/O channels of the DCN and types of the multiple I/O channels;
determine, from content of the one or more messages transmitted by the DCN on the process automation network, the OT capabilities of the DCN; and
based on one or more of the OT capabilities, commission the DCN to the process automation network, wherein the instructions to commission comprise instructions to:
match one or more other process automation nodes on the process automation network to the DCN; and
configure the DCN to cooperate with one or more of the matched other nodes on the process automation network to implement a process control loop that includes operating at least one actuator of one or more of the matched other process automation nodes based on one or more sensor signals generated by one or more of the matched other process automation nodes.

15. The system of claim 14, comprising instructions to match at least one actuator of the process automation network with the DCN based on a profile of the at least one actuator.

16. The system of claim 14, comprising instructions to match at least one sensor of the process automation network with the DCN based on a profile of the at least one sensor.

17. The system of claim 14, wherein one or more of the messages is detected as a multicast message.

18. The system of claim 14, wherein the configuring includes causing configuration data to be installed on the DCN, wherein the configuration data facilitates cooperation between the DCN and the one or more other nodes on the process automation network to implement the process control loop.

* * * * *